United States Patent
Ushirosako et al.

(10) Patent No.: US 9,532,436 B2
(45) Date of Patent: Dec. 27, 2016

(54) LIGHTING CONTROL SYSTEM AND LIGHTING CONTROL METHOD

(71) Applicant: Mitsubishi Electric Corporation, Tokyo (JP)

(72) Inventors: Hiroaki Ushirosako, Tokyo (JP); Yoshiaki Koizumi, Tokyo (JP); Naoyuki Hibara, Tokyo (JP); Masayuki Komatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/782,337

(22) PCT Filed: Apr. 16, 2014

(86) PCT No.: PCT/JP2014/060792
§ 371 (c)(1),
(2) Date: Oct. 5, 2015

(87) PCT Pub. No.: WO2014/171471
PCT Pub. Date: Oct. 23, 2014

(65) Prior Publication Data
US 2016/0029459 A1    Jan. 28, 2016

(30) Foreign Application Priority Data

Apr. 17, 2013 (JP) .................................. 2013-086346

(51) Int. Cl.
*H05B 37/02* (2006.01)
*H05B 37/03* (2006.01)

(52) U.S. Cl.
CPC ...... *H05B 37/0227* (2013.01); *H05B 37/0254* (2013.01); *H05B 37/032* (2013.01)

(58) Field of Classification Search
CPC ............ H05B 37/0209; H05B 37/0254; H05B 37/032; H05B 37/0245; H05B 37/0218; H05B 37/0227; Y02B 20/40; Y02B 20/44
(Continued)

(56) References Cited

U.S. PATENT DOCUMENTS 8,994,276 B2 *  3/2015  Recker ..................... H02J 9/02
                                                              315/160
2010/0225540 A1   9/2010  Koizumi et al.
(Continued)

FOREIGN PATENT DOCUMENTS

JP    2006-302517 A    11/2006
JP    2008-243389 A    10/2008
(Continued)

OTHER PUBLICATIONS

Title:Illumination System and Illumination Control Method (JP2006302517A), Author: Doshisha, Date:Apr. 15, 2005, Publisher:Feb. 11, 2006.*
(Continued)

*Primary Examiner* — Douglas W Owens
*Assistant Examiner* — Wei Chan
(74) *Attorney, Agent, or Firm* — Posz Law Group, PLC

(57) ABSTRACT

The centralized lighting and air conditioning controller controls the light emission of lighting devices using brightness configuration values, and an environmental sensor transmits illuminance measurement values to the centralized lighting and air conditioning controller by wireless communication. The centralized lighting and air conditioning controller receives the illuminance measurement values, and based on the change in the illuminance measurement values and the change in the RSSI when the illuminance measurement values are received, acquires the degree of influence on the environmental sensor by the light from each of the (Continued)

lighting devices, and acquires the unknown or indeterminate position of the environmental sensor based on the degree of influence.

5 Claims, 13 Drawing Sheets

(58) Field of Classification Search
USPC .......... 362/249.02, 806; 315/86, 307, 209 R, 315/224, 225, 172, 308
See application file for complete search history.

(56) References Cited

U.S. PATENT DOCUMENTS

| | | | | |
|---|---|---|---|---|
| 2014/0001977 | A1* | 1/2014 | Zacharchuk | ........ H04L 12/2816 315/291 |
| 2014/0312779 | A1* | 10/2014 | Vissenberg | ........ H05B 33/0851 315/152 |

FOREIGN PATENT DOCUMENTS

| | | |
|---|---|---|
| JP | 2008-243748 A | 10/2008 |
| JP | 2012-174618 A | 9/2012 |
| WO | 2009/034720 A1 | 3/2009 |

OTHER PUBLICATIONS

Title:Illumination System and Illumination Control Method (JP2006302517A), Author: Doshisha, Date:Apr. 15, 2005, Publisher:Feb. 11, 2006 (Translation).*
Title:Illumination Control Method and Illumination Control System (JP2012174618A), Author: Doshisha, Date:Feb. 24, 2011, Publisher:Oct. 9, 2012.*
Title:Illumination Control Method and Illumination Control System (JP2012174618A), Author: Doshisha, Date:Feb. 24, 2011, Publisher:Oct. 9, 2012 (Translation).*
International Search Report of the International Searching Authority mailed Jul. 15, 2014 for the corresponding international application No. PCT/JP2014/060792 (and English translation).
Office Action mailed Jul. 8, 2015 issued in corresponding JP patent application No. 2013-086346 (and English translation).

* cited by examiner

FIG. 6

|  |  | ILLUMINANCE MEASUREMENT VALUE | |
|---|---|---|---|
|  |  | STABLE | UNSTABLE |
| RSSI | STABLE | NO NOISE | NATURAL LIGHT |
|  | UNSTABLE | SHADOWS | NATURAL LIGHT + SHADOWS |

FIG. 7

|   | LIGHTING DEVICE BRIGHTNESS CONFIGURATION VALUE (%) | | | |
|---|---|---|---|---|
|   | LIGHTING DEVICE 100 | LIGHTING DEVICE 110 | LIGHTING DEVICE 120 | LIGHTING DEVICE 130 |
| 1 | 100 | 50 | 50 | 50 |
| 2 | 50 | 100 | 50 | 50 |
| 3 | 50 | 50 | 100 | 50 |
| 4 | 50 | 50 | 50 | 100 |
| 5 | 50 | 50 | 50 | 50 |

FIG. 8

|   | LIGHTING DEVICE BRIGHTNESS CONFIGURATION VALUE (%) | | | | ILLUMINANCE SENSOR 402 ILLUMINANCE MEASUREMENT VALUE (lx) |
|---|---|---|---|---|---|
|   | LIGHTING DEVICE 100 | LIGHTING DEVICE 110 | LIGHTING DEVICE 120 | LIGHTING DEVICE 130 | |
| 1 | 100 | 50 | 50 | 50 | 800 |
| 2 | 50 | 100 | 50 | 50 | 600 |
| 3 | 50 | 50 | 100 | 50 | 500 |
| 4 | 50 | 50 | 50 | 100 | 500 |
| 5 | 50 | 50 | 50 | 50 | 500 |

LIGHTING CONTROL SYSTEM AND LIGHTING CONTROL METHOD

CROSS REFERENCE TO RELATED APPLICATION

This application is a U.S. national stage application of PCT/JP2014/060792 filed on Apr. 16, 2014, which claims priority to Japanese Patent Application No. 2013-086346 filed on Apr. 17, 2013, the contents of which are incorporated herein by reference.

TECHNICAL FIELD

The present disclosure relates to technology for controlling lighting devices.

BACKGROUND ART

In lighting and air conditioning systems inside buildings, it is important to conduct optimal control while accounting for factors such as energy efficiency and the comfort of the residents, using measurement values measured by measuring devices such as lighting sensors and temperature and/or humidity sensors installed in various locations inside a building. Currently, temperature and/or humidity sensors are installed on wall surfaces or the like, and are used by running communication lines inside the walls to transmit temperature and/or humidity measurement values to a controller or the like via wired communication. However, since sensors utilizing wired communication involve complicated work such as laying out communication lines, the installation costs increase. In addition, relocating the sensors is not easy.

For this reason, the wireless transmission of measurement values from a sensor equipped sensors, such as an illuminance sensor and a temperature and/or humidity sensor, (hereinafter, environmental sensor) to a controller or the like by wireless communication has been proposed. By making the environmental sensor wireless, wiring and the like become unnecessary, and installation becomes easy. There are also advantages such as flexibility in choosing the installation location of the environmental sensor, and easy relocation after installation.

Whereas, with an environmental sensor that uses wireless communication, management of the installation location becomes complicated. Particularly, if relocations occur frequently after installation of an environmental sensor, updating of the installation location becomes necessary, which is complicated. For this reason, environmental sensor position detection is conducted.

For example, in Patent Literature 1, the distance between a base station and a radio is computed from factors such as the time taken by communication between the base station and the radio, and the distances from multiple base stations are used to determine the position of the radio. Also, Patent Literature 2 discloses a system using an illuminance sensor capable of wirelessly communicating with lighting equipment, in which the emitted light level of the lighting equipment is controlled, a degree of influence of the lighting equipment with respect to illuminance measuring position is computed according to a regression coefficient calculated based on the change in the emitted light level and the change in the measured illuminance of the illuminance sensor, and control is conducted to set the measured illuminance from the illuminance sensor at a target illuminance. Furthermore, in Patent Literature 3, when a degree of influence is already known, a natural light estimation formula is computed from the total illuminance, including natural light, at an illumination sensor.

CITATION LIST

Patent Literature

Patent Literature 1: International Publication No. WO 2009-034720
Patent Literature 2: Unexamined Japanese Patent Application Kokai Publication No. 2008-243389
Patent Literature 3: Unexamined Japanese Patent Application Kokai Publication No. 2012-174618

SUMMARY OF INVENTION

Technical Problem

However, with the technology disclosed in Patent Literature 1, base stations are required to be installed to determine the position of the radio, which increases installation costs. Also, with the technology disclosed Patent Literature 2, when the change in the emitted light level of the lighting equipment and the change in the measured illuminance of the illuminance sensor are acquired, noise, such as natural light and shadows, is not considered. Also, with the technology disclosed in Patent Literature 3, the position of the illuminance sensor must be known in advance.

The present disclosure was devised in light of the above circumstances, and an objective thereof is to provide a lighting control system and a lighting control method enabling the determination, without foreknowledge, of the position of a measuring device that measures illuminance.

Solution to Problem

In order to achieve the above objective, a lighting control system according to the present disclosure comprises:
a plurality of lighting devices configured to emit light;
a control device configured to control the plurality of lighting devices; and
a measuring device configured to measure an illumination, wherein
the measuring device comprises:
transmitting means for transmitting a wireless signal indicating an illumination measurement to the control device,
the control device comprises:
receiving means for receiving the wireless signal indicating the illumination measurement from the measuring device; and
position acquiring means, and
the position acquiring means:
applies the illumination measurement indicated by the wireless signal received by the receiving means and a received signal strength indicator of the wireless signal received by the receiving means to a correspondence relationship to determine an emission pattern per the lighting device of the plurality of lighting devices, the correspondence relationship being a relationship between the emission pattern per the lighting device to acquire a position of the measuring device, and the illumination measurement and the received signal strength indicator;
controls the plurality of lighting devices to emit light according to the determined emission pattern;

while the plurality of lighting devices emits the light according to the determined emission pattern, based on the illumination measurement measured by the measuring device and the emission pattern per the lighting device, calculates a degree of influence of emission per the lighting device relative to the illumination measurement by the measuring device; and acquires, based on positions of the plurality of lighting devices and the degree of influence per the lighting device, the position of the measuring device relative to the positions of the plurality of lighting devices.

Advantageous Effects of Invention

According to the present disclosure, it is possible to enable the determination, without foreknowledge, of the position of a measuring device that measures illuminance.

BRIEF DESCRIPTION OF DRAWINGS

FIG. 6 is a diagram illustrating an example of a noise determination standard according to the embodiment of the present disclosure;

FIG. 7 is a diagram illustrating an example of a brightness configuration pattern A according to the embodiment of the present disclosure;

FIG. 8 is a diagram illustrating an example of correspondence between the brightness configuration pattern A and an illuminance measurement value according to the embodiment of the present disclosure;

DESCRIPTION OF EMBODIMENTS

Hereinafter, an exemplary embodiment of the present disclosure is described with reference to the drawings.

Figure 1:
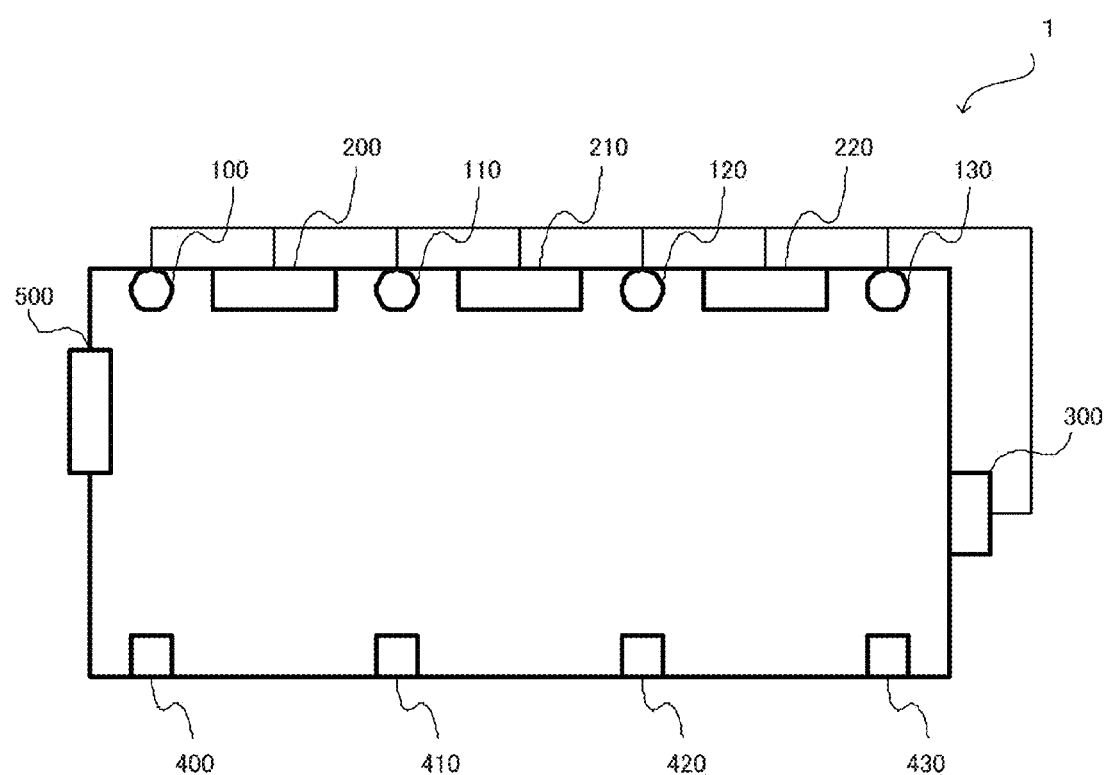
FIG. 1 is a diagram illustrating a configuration of a lighting and air conditioning control system according to an embodiment of the present disclosure.

FIG. 1 is a diagram illustrating a configuration of a lighting and air conditioning control system 1 that acts as a lighting control system according to the embodiment of the present disclosure. The lighting and air conditioning control system 1 is installed in a space, such as an office, provided with a window 500 that lets in natural light, such as sunlight. The lighting and air conditioning control system 1 includes four lighting devices 100, 110, 120, and 130, three air conditioning devices 200, 210, and 220, a centralized lighting and air conditioning controller 300, and four environmental sensors 400, 410, 420, and 430. The lighting devices 100, 110, 120, and 130 are light-emitting diode (LED) lights attached to a ceiling, for example. The air conditioning devices 200, 210, and 220 are industrial ceiling-mounted air conditioners, for example, and are able to regulate the temperature and airflow.

Note that the numbers of lighting devices, air conditioning devices, and environmental sensors are not limited to those of FIG. 1. It is sufficient to include at least one of each device, and the numbers of respective devices may also be different from each other. Additionally, the centralized lighting and air conditioning controller 300 may also be installed in multiple locations. Also, although the lighting devices and the air conditioning devices are alternately arranged along a straight line in FIG. 1, the arrangement is not limited thereto. For example, two lighting devices may be installed between one air conditioning device and another air conditioning device, or vice versa. The air conditioning devices and lighting devices may also be arranged in a matrix. In the present embodiment, the installation positions of the four lighting devices 100, 110, 120, and 130 and the three air conditioning devices 200, 210, and 220 are known in advance. The installation positions of the environmental sensors 400, 410, 420, and 430 are unknown or indeterminate.

Figure 2:
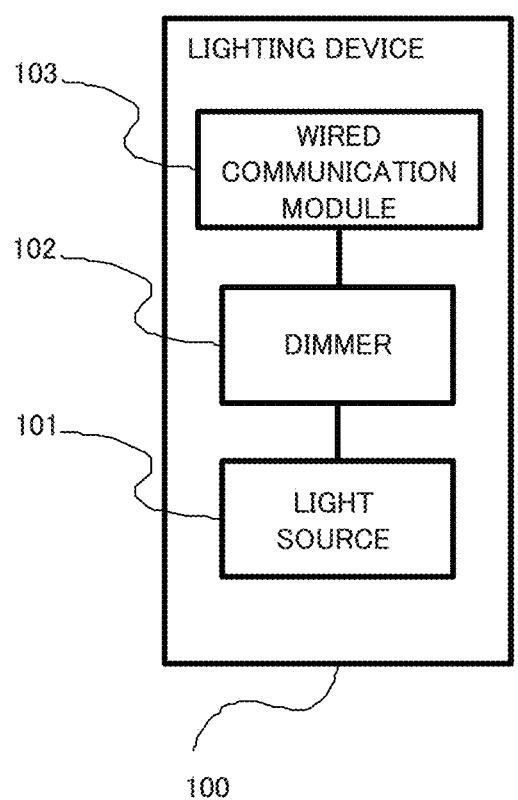
FIG. 2 is a diagram illustrating a configuration of a lighting device according to the embodiment of the present disclosure.

FIG. 2 is a diagram illustrating a configuration of the lighting device 100. Note that the lighting devices 110, 120, and 130 also have a configuration similar to the lighting device 100. The lighting device 100 illustrated in FIG. 2 includes a light source 101, a dimmer 102, and a wired communication module 103.

The dimmer 102 includes a central processing unit (CPU), for example. The wired communication module 103 is able to conduct wired communication with the centralized lighting and air conditioning controller 300, receives a brightness configuration value from the centralized lighting and air conditioning controller 300, and outputs the brightness configuration value to the dimmer 102. The dimmer 102 adjusts the brightness of the light source 101 according to the brightness configuration value. Various techniques are used for brightness adjustment. For example, the dimmer 102 may be able to set the brightness from 0% to 100% in steps of 5%, only turn the light source 101 on or off, or set the brightness continuously from 0% to 100%.

Figure 3:
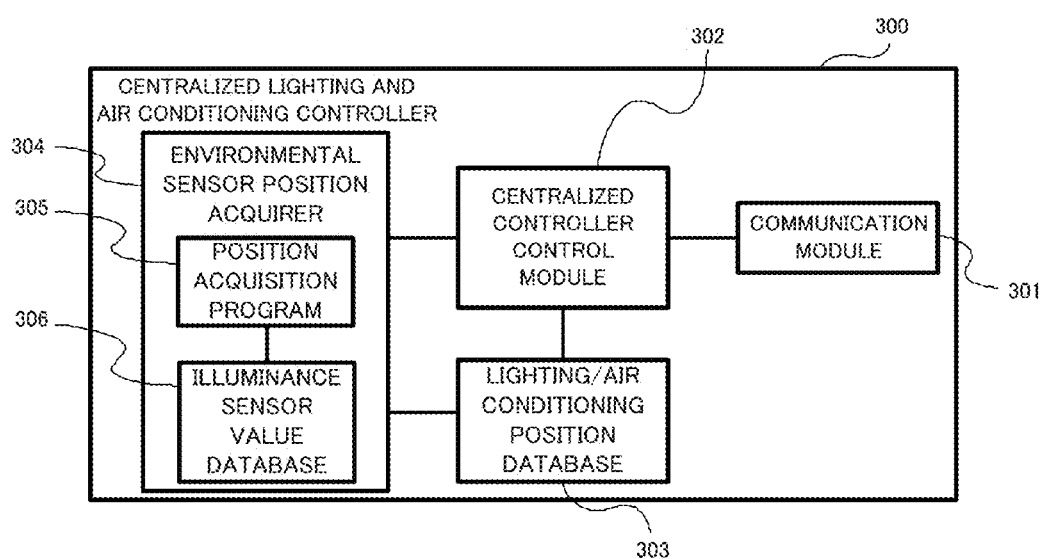
FIG. 3 is a diagram illustrating a configuration of a centralized lighting and air conditioning controller according to the embodiment of the present disclosure.

FIG. 3 is a diagram illustrating a configuration of the centralized lighting and air conditioning controller 300. The centralized lighting and air conditioning controller 300 illustrated in FIG. 3 includes a communication module 301, a centralized controller control module 302, a lighting/air conditioning position database 303, and an environmental sensor position acquirer 304.

The communication module 301 is able to conduct wired communication with the lighting devices 100 to 130 and the air conditioning devices 200 to 220. In addition, the communication module 301 includes a function of wireless communication including Wireless Fidelity (Wi-Fi), ZigBee and the like, and is able to conduct wireless communication with the environmental sensors 400 to 430.

The centralized controller control module 302 includes components such as a central processing unit (CPU) and read-only memory (ROM) in which a control program is recorded, for example. The centralized controller control module 302 controls the lighting devices 100 to 130 and the air conditioning devices 200 to 220, and acquires measurement values of luminance, temperature and/or humidity, and the like from the environmental sensors 400 to 430, for example.

The lighting/air conditioning position database 303 includes ROM or the like, for example. The lighting/air conditioning position database 303 stores information about the installation positions of the lighting devices 100 to 130 and the air conditioning devices 200 to 220.

The environmental sensor position acquirer 304 includes ROM or the like, for example. The environmental sensor position acquirer 304 stores a position acquisition program 305 for acquiring the positions of the environmental sensors 400 to 430, and also configures an illuminance sensor value database 306. The illuminance sensor value database 306 stores the brightness configuration values of the lighting devices 100 to 130, and the illuminance measurement values from the environmental sensors 400 to 430 when the lighting devices 100 to 130 emit light at the brightness configuration values.

Figure 4:
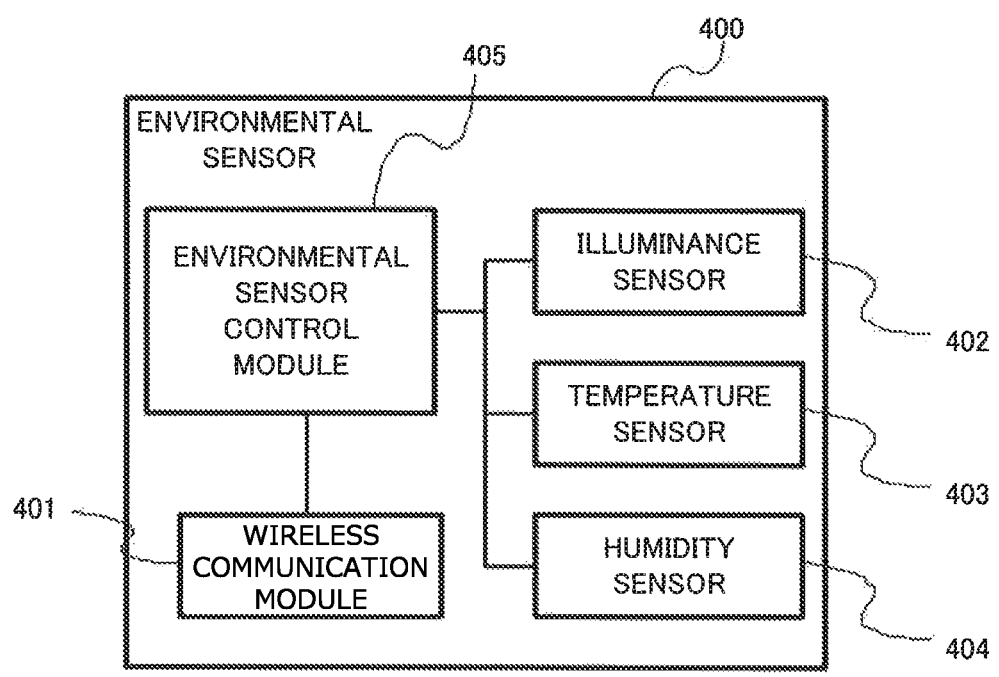
FIG. 4 is a diagram illustrating a configuration of an environmental sensor according to the embodiment of the present disclosure.

FIG. 4 is a diagram illustrating a configuration of the environmental sensor 400. Note that the environmental sensors 410, 420, and 430 also have a configuration similar to the environmental sensor 400. The environmental sensor 400 illustrated in FIG. 4 includes a wireless communication module 401, an illuminance sensor 402, a temperature sensor 403, a humidity sensor 404, and an environmental sensor control module 405.

The wireless communication module 401 includes a function of wireless communication, such as Wi-Fi, ZigBee and the like, and is able to conduct wireless communication with the centralized lighting and air conditioning controller 300.

The illuminance sensor 402, the temperature sensor 403, and the humidity sensor 404 are sensors for measuring environmental information at the installation position of the environmental sensor 400. The illuminance sensor 402 includes a photodiode, for example, and measures the illuminance at the installation position of the environmental sensor 400. The temperature sensor 403 includes a thermocouple or a thermistor, for example, and measures the temperature at the installation position of the environmental sensor 400. The humidity sensor 404 is of the capacitive type using aluminum oxide, for example, and measures the humidity at the installation position of the environmental sensor 400. The measurement values from the illuminance sensor 402, the temperature sensor 403, and the humidity sensor 404 are output to the environmental sensor control module 405. Note that other sensors, such as a presence sensor or a sensor that measures carbon dioxide, for example, may be additionally provided.

The environmental sensor control module 405 includes components such as a CPU and ROM in which a control program is recorded and the like, for example. The environmental sensor control module 405 transmits measurement values from the illuminance sensor 402, the temperature sensor 403, and the humidity sensor 404 to the centralized lighting and air conditioning controller 300 via the wireless communication module 401.

Figure 5:
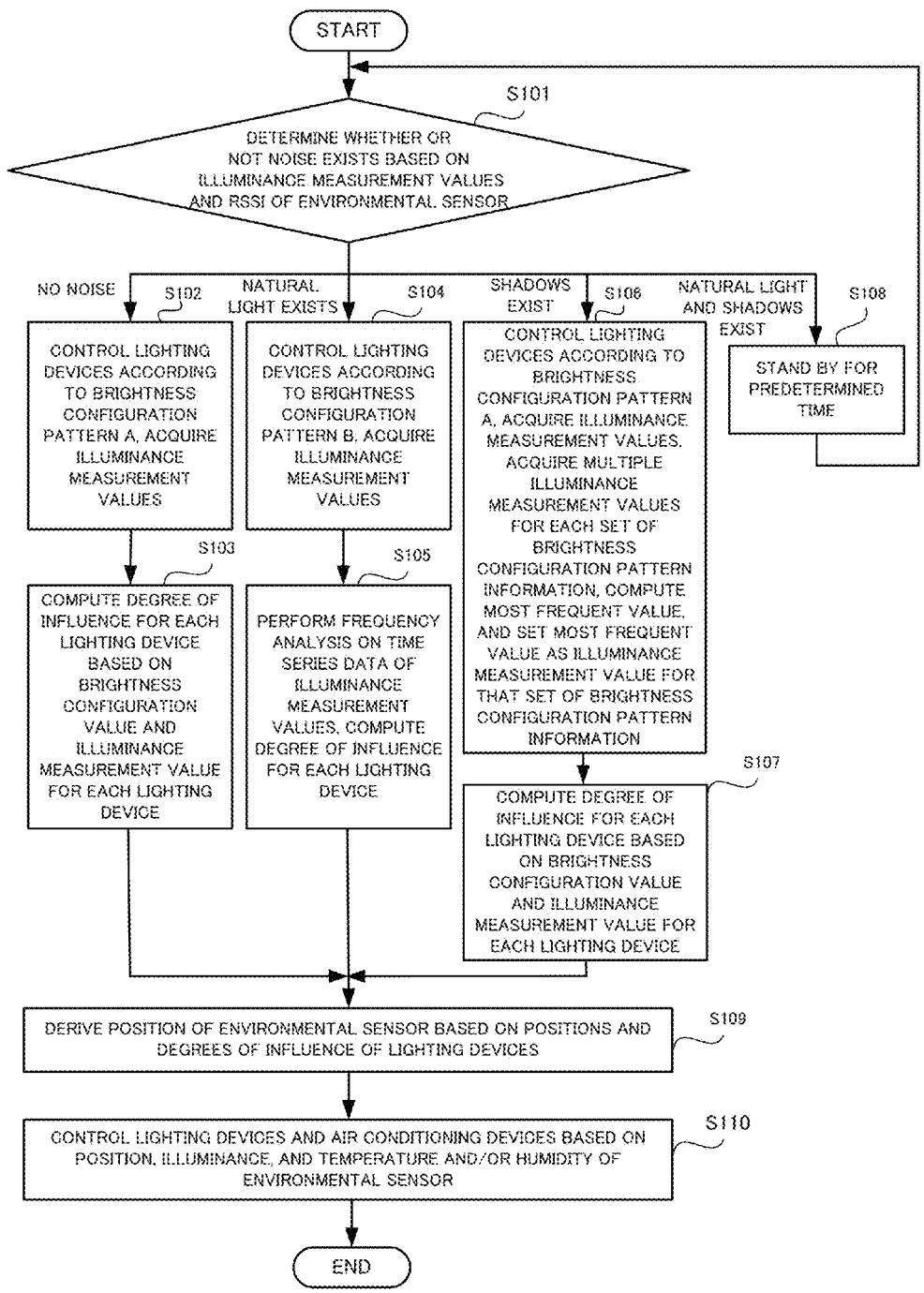
FIG. 5 is a flowchart illustrating operation of a centralized lighting and air conditioning controller according to the embodiment of the present disclosure.

Next, operation of the lighting and air conditioning control system 1 is described. FIG. 5 is a flowchart illustrating operation when the position of the environmental sensor 400 is acquired by the centralized lighting and air conditioning controller 300 in the lighting and air conditioning control system 1. Note that although FIG. 5 illustrates the operation of the centralized lighting and air conditioning controller 300 acquiring the position of the environmental sensor 400, the positions of the other environmental sensors 410 to 430 may also be acquired similarly.

Prior to the operation illustrated in FIG. 5, the centralized controller control module 302 in the centralized lighting and air conditioning controller 300 executes the position acquisition program 305, and transmits a fixed brightness configuration value (for example, 50% of the maximum brightness) to the lighting devices 100 to 130 via the communication module 301. Note that the brightness configuration value is not modified until the end of the operation in step S101 of FIG. 5.

The dimmer 102 in each of the lighting devices 100 to 130 receives the brightness configuration value via the wired communication module 103, and adjusts the brightness of the light source 101 according to the brightness configuration value. Consequently, the lighting devices 100 to 130 enter a light-emitting state. The illuminance sensor 402 in the environmental sensor 400 measures the illuminance at the installation position of the environmental sensor 400, and outputs an illuminance measurement value to the environmental sensor control module 405. The environmental sensor control module 405 transmits the illuminance measurement value by wireless communication to the centralized lighting and air conditioning controller 300 via the wireless communication module 401. At this point, the lighting devices 100 to 130 continue to emit light, the illuminance sensor 402 continuously measures the illuminance, and the environmental sensor control module 405 continuously transmits an illuminance measurement value.

The centralized controller control module 302 in the centralized lighting and air conditioning controller 300, for a predetermined period, receives the illuminance measurement value from the environmental sensor 400 via the communication module 301, and also measures a received signal strength indication (RSSI) when receiving the illuminance measurement value. Additionally, the centralized controller control module 302, based on the illuminance measurement value and the RSSI value acquired during the predetermined period, determines whether or not noise exists due to natural light or the shadow of a moving object such as a person (hereinafter, shadow) (step S101).

Specifically, the centralized controller control module 302 determines whether or not noise exists in accordance with the determination standard illustrated in FIG. 6. In FIG. 6, a stable illuminance measurement value indicates that variation in the illuminance measurement value acquired during the predetermined period is less than or equal to a preset illuminance threshold, whereas an unstable illuminance measurement value indicates that variation in the illuminance measurement value acquired during the predetermined period exceeds the illuminance threshold. Also, a stable RSSI indicates that variation in the RSSI acquired during the predetermined period is less than or equal to a preset RSSI threshold, whereas an unstable RSSI indicates that variation in the RSSI acquired during the predetermined period exceeds the RSSI threshold. For example, the illuminance threshold is 5/x, and the RSSI threshold is 5 dB.

Conceivable factors causing instability in the illuminance measurement value during the predetermined period when the illuminance measurement value is constant are the influence of natural light and the influence of shadows. Also, a conceivable factor causing instability in the RSSI during the predetermined period is the possibility of a person or the like being present near the environmental sensor 400 and the centralized lighting and air conditioning controller 300. Consequently, when the illuminance measurement value and the RSSI are both stable, noise due to natural light and shadows is considered to be non-existent. Also, when the illuminance measurement value is unstable and the RSSI is stable, noise due to natural light is considered to exist, while noise due to shadows is considered to be non-existent. Also, when the illuminance measurement value is stable and the RSSI is unstable, there is a possibility that a person or the like is present nearby, and thus noise due to shadows is considered to exist. Furthermore, when the illuminance measurement value and the RSSI are both unstable, noise due to natural light and shadows is considered to exist.

In the noise determination of step S101, if no noise is determined to exist, the process proceeds to step S102. If noise due to natural light is determined to exist, the process proceeds to step S104. If noise due to shadows is determined to exist, the process proceeds to step S106. If noise due to natural light and shadows is determined to exist, the process proceeds to step S108.

In the noise determination of step S101, if no noise is determined to exist, upon the lighting devices 100 to 130 emitting light according to one combination of brightness configuration values for each of the lighting devices 100 to 130 (hereinafter, brightness configuration pattern information), the illuminance measurement values at the environmental sensor 400 will become a constant value. In the present embodiment, since four lighting devices 100 to 130 are provided, the light emission of the lighting devices 100 to 130 is controlled with at least five sets of linearly independent brightness configuration pattern information, and the illuminance measurement value at the environmental sensor 400 is acquired for each set of brightness configuration pattern information. As a result, the degree of influence on the environmental sensor 400 by the light from each of the lighting devices 100 to 130 may be acquired, and in addition, the position of the environmental sensor 400 may be acquired based on the degree of influence.

Specifically, in the noise determination of step S101, if no noise is determined to exist, the centralized controller control module 302 controls the lighting devices 100 to 130 according to a brightness configuration pattern A including the five sets of brightness configuration pattern information illustrated in FIG. 7, for example, and also acquires the illuminance measurement values measured by the environmental sensor 400 for each of the five sets of brightness configuration pattern information (step S102).

In step S102, the centralized controller control module 302 reads the brightness configuration pattern A illustrated in FIG. 7 from the illuminance sensor value database 306 in the environmental sensor position acquirer 304, and selects each set of brightness configuration pattern information in the brightness configuration pattern A one at a time. Additionally, the centralized controller control module 302 transmits the brightness configuration values for each of the lighting devices 100 to 130 in the selected brightness configuration pattern information to the corresponding lighting devices 100 to 130 via the communication module 301. Next, while the lighting devices 100 to 130 are emitting light according to the transmitted brightness configuration values, the centralized controller control module 302 receives the illuminance measurement value measured and transmitted by the environmental sensor 400 via the communication module 301. Furthermore, the centralized controller control module 302 adds the received illuminance measurement value to the corresponding brightness configuration pattern information, as illustrated in FIG. 8. The above process is repeated every time brightness configuration pattern information is selected, and illuminance measurement values are added to all five sets of brightness configuration pattern information.

Next, the centralized controller control module 302, based on the brightness configuration values for each of the lighting devices 100 to 130 and the illuminance measurement values from the environmental sensor 400, computes the degree of influence on the environmental sensor 400 by the light from each of the lighting devices 100 to 130 (step S103).

Specifically, the degree of influence is computed according to the following method. Provided that fx is the brightness configuration value for a lighting device X, L is the illuminance measurement value corresponding to that brightness configuration value, and N is an offset, the degree of influence ax by the lighting device X corresponding to one set of brightness configuration pattern information in the brightness configuration pattern A is defined as follows. Herein, the offset N indicates the influence of light such as by lighting devices other than the lighting devices 100 to 130, and is a constant value.

$$f_{100}\alpha_{100}+f_{110}\alpha_{110}+f_{120}\alpha_{120}+f_{130}\alpha_{130}+N=L \quad \text{[Math 1]}$$

As illustrated in FIG. 8, since the five sets of brightness configuration pattern information in the brightness configuration pattern A are associated with illuminance measurement values, for each of the five sets of brightness configuration pattern information, Math. 1 is applied to obtain Math. 2.

$$\begin{pmatrix} 100 & 50 & 50 & 50 & 1 \\ 50 & 100 & 50 & 50 & 1 \\ 50 & 50 & 100 & 50 & 1 \\ 50 & 50 & 50 & 100 & 1 \\ 50 & 50 & 50 & 50 & 1 \end{pmatrix} \begin{pmatrix} \alpha_{100} \\ \alpha_{110} \\ \alpha_{120} \\ \alpha_{130} \\ N \end{pmatrix} = \begin{pmatrix} 800 \\ 600 \\ 500 \\ 500 \\ 500 \end{pmatrix} \quad \text{[Math. 2]}$$

Herein, since the five sets of brightness configuration pattern information are linearly independent, the matrix on the left side of Math. 2 is regular, and every matrix is configured to have an inverse matrix. Consequently, the degree of influence ax of the lighting device X is computable according to Math. 3.

$$\begin{pmatrix} \alpha_{100} \\ \alpha_{110} \\ \alpha_{120} \\ \alpha_{130} \\ N \end{pmatrix} = \begin{pmatrix} 6 \\ 2 \\ 0 \\ 0 \\ 100 \end{pmatrix} \quad \text{[Math. 3]}$$

Also, in the noise determination of step S101, if noise due to natural light is determined to exist, even if the lighting devices 100 to 130 emit light according to one set of brightness configuration pattern information, the illuminance measurement value at the environmental sensor 400 will not become a constant value. Accordingly, in the present embodiment, each of the lighting devices 100 to 130 is controlled by a sequence of brightness configuration values each having a frequency component unique to each lighting device. Furthermore, by extracting the unique frequency components from the time series data of illuminance measurement values, the degree of influence on the environmental sensor 400 by the light from each of the lighting devices 100 to 130 may be acquired, and in addition, the position of the environmental sensor 400 may be acquired based on the degree of influence.

Figure 9:
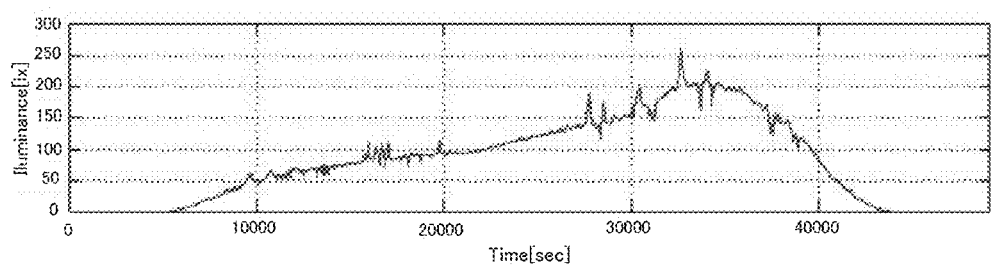
FIG. 9 is a diagram illustrating an example of the illuminance of natural light according to the embodiment of the present disclosure.
Figure 10:
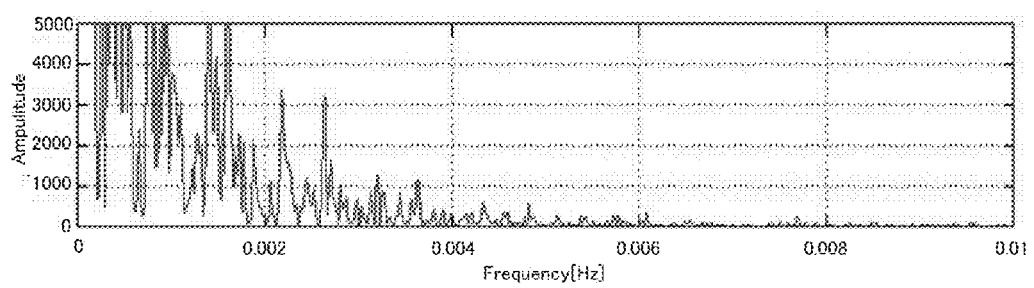
FIG. 10 is a diagram illustrating an example of a frequency analysis result of the illuminance of natural light according to the embodiment of the present disclosure.

FIG. 9 illustrates the results of measuring illuminance due to natural light in an actual space, such as an office. If the frequency components of the measurement results in FIG. 9 are extracted using a fast Fourier transform (FFT), for example, the results illustrated in FIG. 10 are obtained. Almost all illuminance variation due to natural light has a frequency component of less than 0.004 Hz, and thus by controlling the lighting devices 100 to 130 according to a sequence of brightness configuration values that includes a frequency component equal to or greater than 0.004 Hz, it is possible to distinguish between variation in illuminance measurement values at the environmental sensor 400 due to variation in the brightness configuration values of the lighting devices 100 to 130, and variation in illuminance measurement values at the environmental sensor 400 due to changes in natural light.

Specifically, in the noise determination of step S101, if noise due to natural light is determined to exist, the centralized controller control module 302 controls the lighting devices 100 to 130 according to a brightness configuration pattern B illustrated in FIGS. 11A to 11D, for example, and also acquires the illuminance measurement values measured by the environmental sensor 400 (step S104).

Figure 11A:
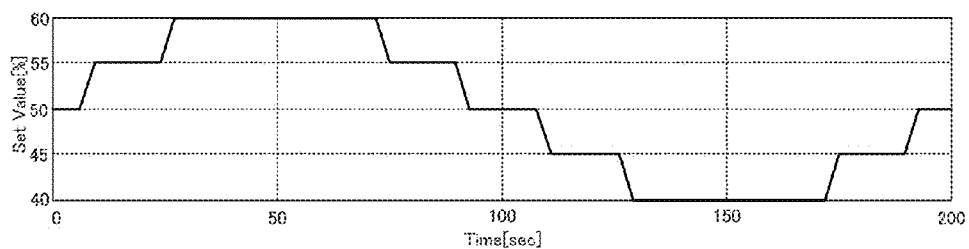
FIG. 11A is a diagram illustrating an example of a brightness configuration pattern B according to the embodiment of the present disclosure.
Figure 11B:
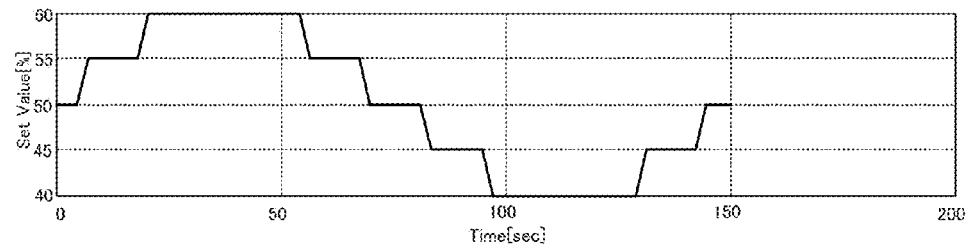
FIG. 11B is a diagram illustrating an example of the brightness configuration pattern B according to the embodiment of the present disclosure.
Figure 11C:
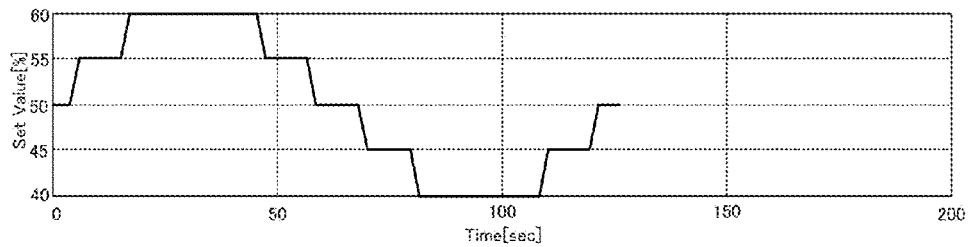
FIG. 11C is a diagram illustrating an example of the brightness configuration pattern B according to the embodiment of the present disclosure.
Figure 11D:
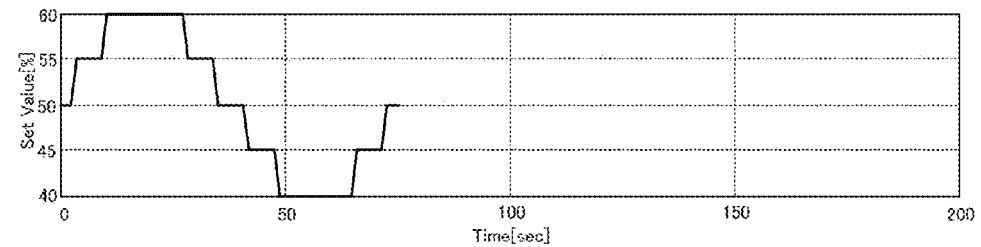
FIG. 11D is a diagram illustrating an example of the brightness configuration pattern B according to the embodiment of the present disclosure.

As illustrated in FIG. 11A, the sequence of brightness configuration values for the lighting device 100 has a frequency component on a cycle of 200 sec. (a frequency of 0.005 Hz). As illustrated in FIG. 11B, the sequence of brightness configuration values for the lighting device 110 has a frequency component on a cycle of 150 sec. (a frequency of 0.0067 Hz). As illustrated in FIG. 11C, the sequence of brightness configuration values for the lighting device 120 has a frequency component on a cycle of 120 sec. (a frequency of 0.0083 Hz). As illustrated in FIG. 11D, the sequence of brightness configuration values for the lighting device 130 has a frequency component on a cycle of 80 sec. (a frequency of 0.0125 Hz). It is assumed that although FIGS. 11A to 11D illustrate only one cycle of the sequence of brightness configuration values, each of the lighting devices 100 to 130 are made to repeat the sequence of brightness configuration values for a fixed time.

In the present embodiment, suppose that when position acquisition of the environmental sensor 400 is not conducted, the brightness configuration values of all of the lighting devices 100 to 130 are controlled to a fixed value, such as 50% of maximum brightness, whereas when position acquisition of the environmental sensor 400 is conducted, the brightness configuration values are controlled based on the brightness configuration pattern B illustrated in FIGS. 11A to 11D.

Figure 12:
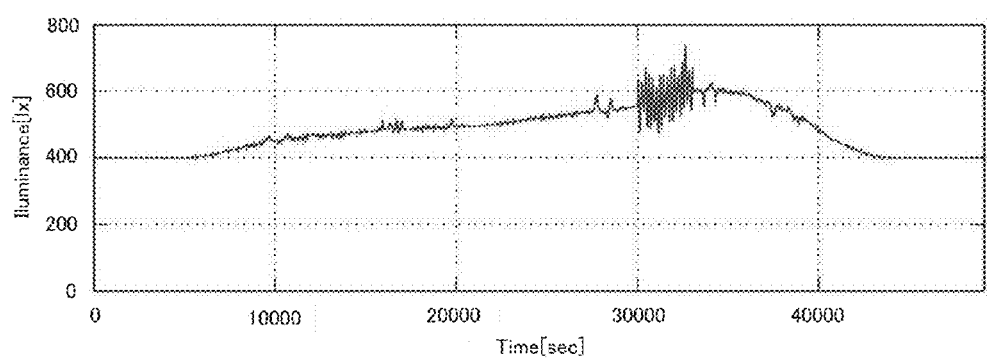
FIG. 12 is a diagram illustrating an example of illuminance measurement values in the case of the brightness configuration pattern B according to the embodiment of the present disclosure.

FIG. 12 is a diagram illustrating an example of illuminance measurement values by the environmental sensor 400 in the case of the brightness configuration pattern B. In FIG. 12, the brightness configuration values are controlled based on the brightness configuration pattern B during the time from 30,000 to 33,100 sec., and the position of the environmental sensor 400 is acquired. Whereas, during the time outside 30,000 to 33,100 sec., the brightness configuration value of each lighting device is controlled to 50% of maximum brightness.

Next, the centralized controller control module 302 performs frequency analysis on the time series data of illuminance measurement values by the environmental sensor 400, and computes the degree of influence on the environmental sensor 400 by the light from each of the lighting devices 100 to 130 (step S105).

Figure 13:
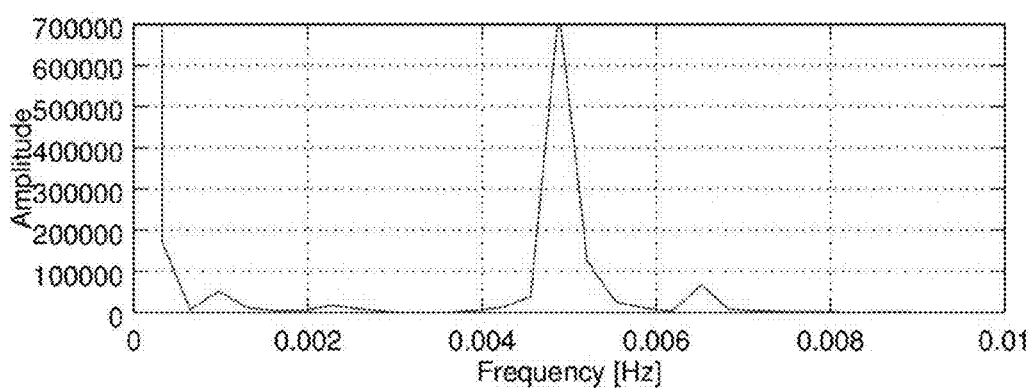
FIG. 13 is a diagram illustrating an example of a frequency analysis result of illuminance measurement values in the case of the brightness configuration pattern B according to the embodiment of the present disclosure.

Specifically, the centralized controller control module 302 extracts the frequency component from the time series data of illuminance measurement values using the FFT. For example, as illustrated in FIG. 12, when the brightness configuration values are controlled based on the brightness configuration pattern B during the time from 30,000 to 33,100 sec., the result of applying the FFT to the time series data of illuminance measurement values within the corresponding time period is similar to that illustrated in FIG. 13. Additionally, the centralized controller control module 302 computes the degree of influence according to the following method.

If noise due to natural light exists, the degree of influence $a_X$ of the lighting device X is defined as the ratio of the amplitude of the frequency component indicated by the sequence of brightness configuration values for the lighting device X. For example, if the sequence of brightness configuration values is as illustrated in FIGS. 11A to 11D, the lighting device 100 is controlled by the sequence of brightness configuration values including a frequency component with a frequency of 0.005 Hz, and thus the amplitude is approximately 730,000. The lighting device 110 is controlled by the sequence of brightness configuration values including a frequency component with a frequency of 0.0067 Hz, and thus the amplitude is approximately 67,000. The lighting device 120 is controlled by the sequence of brightness configuration values including a frequency component with a frequency of 0.0083 Hz, and thus the amplitude is approximately 1,667. The lighting device 130 is controlled by the sequence of brightness configuration values including a frequency component with a frequency of 0.0125 Hz, and thus the amplitude is approximately 265. The ratio of amplitudes is thus 730,000:67,000:1,667:265=10.9:1:0.025:0.004, and consequently the degree of influence $a_X$ of the lighting device X is as follows in Math. 4.

$$\begin{pmatrix} \alpha_{100} \\ \alpha_{110} \\ \alpha_{120} \\ \alpha_{130} \end{pmatrix} = \begin{pmatrix} 10.9 \\ 1 \\ 0.025 \\ 0.004 \end{pmatrix} \fallingdotseq \begin{pmatrix} 10.9 \\ 1 \\ 0 \\ 0 \end{pmatrix} \qquad \text{[Math. 4]}$$

Herein, the degree of influence of the lighting devices 120 and 130 is significantly small compared to the lighting devices 100 and 110, and thus may be ignored.

Also, in the noise determination of step S101, if noise due to shadows is determined to exist, it is assumed, for example, that a person passed by close to the environmental sensor 400. When a person passes by close to the environmental sensor 400, noise occurs for only a comparatively short time (from one to a couple seconds) during which the person exists between the environmental sensor 400 and the lighting device 100 or the like. In such a case, the brightness configuration values of the lighting devices 100 to 130 are controlled for a comparatively long time (from a couple dozen seconds to a couple minutes) with one set of brightness configuration pattern information, and the most frequent value of the multiple illuminance measurement values acquired by the environmental sensor 400 during that period is regarded as the illuminance measurement value corresponding to that set of brightness configuration pattern information.

Specifically, in the noise determination of step S101, if noise due to shadows is determined to exist, the centralized controller control module 302 controls the lighting devices 100 to 130 according to the brightness configuration pattern A including the five sets of brightness configuration pattern information illustrated in FIG. 7, for example. Additionally, the centralized controller control module 302 acquires multiple illuminance measurement values for the brightness configuration pattern information of a brightness configuration pattern A1, computes the most frequent value among these multiple illuminance measurement values, and sets the most frequent value as the illuminance measurement value for the brightness configuration pattern information (step S106).

In step S106, the centralized controller control module 302 selects each set of brightness configuration pattern information in the brightness configuration pattern A one at a time. Additionally, the centralized controller control module 302 transmits the brightness configuration values for each of the lighting devices 100 to 130 in the selected set of brightness configuration pattern information to the corresponding lighting devices 100 to 130 via the communication module 301. Next, while the lighting devices 100 to 130 are emitting light according to the transmitted brightness configuration values, the centralized controller control module 302 receives the illuminance measurement values measured and transmitted by the environmental sensor 400 via the communication module 301.

After that, the centralized controller control module 302 stands by until the received illuminance measurement values reach a predetermined number (for example, 50). Herein, the predetermined number is set to a number of illuminance measurement values acquired and transmitted by the environmental sensor 400 and received by the centralized lighting and air conditioning controller 300 over a time (from a couple dozen seconds to a couple minutes) that is significantly longer than the estimated time during which a person exists between the environmental sensor 400 and the lighting device 100 or the like (from one to a couple seconds). When the received illuminance measurement values reach the predetermined number, the centralized controller control module 302 determines the most frequent value among the predetermined number of illuminance measurement values, regards the most frequent value as the illuminance measurement value, and adds that value to the corresponding brightness configuration pattern information. The above process is repeated every time brightness configuration pattern information is selected, and illuminance measurement values are added to all five sets of brightness configuration pattern information.

Next, the centralized controller control module 302, based on the brightness configuration values for each of the lighting devices 100 to 130 and the illuminance measurement values from the environmental sensor 400, computes the degree of influence on the environmental sensor 400 by the light from each of the lighting devices 100 to 130 (step S107). The specific operation is similar to that in step S103.

Also, in the noise determination of step S101, if noise due to natural light and shadows is determined to exist, this noise is not easily distinguished from changes in the illuminance measurement value at the environmental sensor 400 in response to a change in the brightness configuration values of the lighting devices 100 to 130. For this reason, in order to stand by until at least one of the noise due to natural light or shadows no longer exists, the centralized controller control module 302 does not conduct position acquisition of the environmental sensor 400, and stands by for a predetermined time (for example, one hour) (step S108). After that, the operation starting from step S101 is repeated.

Meanwhile, in any of step S103, step S105, and step S107, after the degree of influence on the environmental sensor 400 by the light from each of the lighting devices 100 to 130 is computed, the centralized controller control module 302 derives the position of the environmental sensor 400 based on the positions of the lighting devices 100 to 130 and the degree of influence (step S109).

Specifically, the centralized controller control module 302 reads the positions of the lighting devices 100 to 130 stored in the lighting/air conditioning position database 303. Next, for example, the centralized controller control module 302 derives the position of the environmental sensor 400 based on the positions of the lighting devices 100 to 130 and the degree of influence on the environmental sensor 400 by the light from each of the lighting devices 100 to 130, so that the distance from the environmental sensor 400 to the lighting devices 100 to 130 is inversely proportional to the degree of influence corresponding to the lighting devices 100 to 130. For example, if the ratio of the degree of influence corresponding to the lighting devices 100, 110, 120, and 130 is 4:3:2:1, the position of the environmental sensor 400 becomes the position at which the ratio of the distance to the lighting devices 100, 110, 120, and 130 becomes 1:2:3:4.

As another example, when illuminance measurement values are acquired as illustrated in FIG. 8, and the degree of influence corresponding to the lighting device 100 is the largest, the centralized controller control module 302 regards the environmental sensor 400 as existing at a position closest to the lighting device 100 from among the lighting devices 100 to 130, such as directly under the lighting device 100. Note that in step S110 to be discussed below, when the lighting devices 100 to 130 and the air conditioning devices 200 to 220 are controlled based on the illuminance measurements value and temperature and/or humidity measurement values acquired and transmitted by the environmental sensor 400, the precision of position acquisition for the environmental sensor 400 may be approximately the installation spacing between the lighting devices 100 to 130 (for example, 2 meters).

As another example, the centralized controller control module 302 may also acquire the position of the environmental sensor 400 by taking a weighted average of the positions of the lighting devices 100 to 130, using the degree of influence for the weighting. For example, when the degree of influence is computed as illustrated by Math. 3 in step S103, the degree of influence for the lighting device 100 and the lighting device 110 is 6 and 2, respectively. At this point, provided that (x100, y100) is the planar position of the lighting device 100 and (x110, y110) is the planar position of the lighting device 110, the position (x, y) of the environmental sensor 400 becomes as follows.

$$\begin{pmatrix} x \\ y \end{pmatrix} = \frac{6}{6+2} \begin{pmatrix} x_{100} \\ y_{100} \end{pmatrix} + \frac{2}{6+2} \begin{pmatrix} x_{110} \\ y_{110} \end{pmatrix} \qquad \text{[Math. 5]}$$

Also, if properties, such as the size and brightness, of the lighting devices 100 to 130 are known in advance, the illuminance by the lighting devices 100 to 130 at the position (x, y) may be calculated, and the position (x, y) at which the calculated value becomes equal to the actually-measured degree of influence may be regarded as the position of the environmental sensor 400.

Next, the centralized controller control module 302 controls the lighting devices 100 to 130 and the air conditioning devices 200 to 220 based on the derived position of the environmental sensor 400, and the illuminance measurement values and the temperature and/or humidity measurement values acquired and transmitted by the environmental sensor 400 (step S110). For example, if there is natural light from the window 500, the illuminance measurement values from the environmental sensor 400 are high, and the environmental sensor 400 is regarded as existing at a position closest to the lighting device 100 from among the lighting devices 100 to 130, the centralized controller control module 302 lowers the brightness configuration value of the lighting device 100. As another example, if the temperature measurement value from the environmental sensor 400 is higher than a set value, the centralized controller control module 302 controls the air conditioning device 200 so that the temperature at the position of the environmental sensor 400 decreases.

As discussed above, in the lighting and air conditioning control system 1 according to the present embodiment, the centralized lighting and air conditioning controller 300 controls the light emission of the lighting devices 100 to 130 using brightness configuration values, and the environmental sensor 400 transmits illuminance measurement values to the centralized lighting and air conditioning controller 300 by wireless communication. The centralized lighting and air conditioning controller 300 receives the illuminance measurement values, and based on the change in the illuminance measurement values and the change in the RSSI when the illuminance measurement values are received, acquires the degree of influence on the environmental sensor 400 by the light from each of the lighting devices 100 to 130, and acquires the unknown or indeterminate position of the environmental sensor 400 based on the degree of influence.

In this way, since the change in the illuminance measurement values and the change in the RSSI when the illuminance measurement values are received are considered to acquire the degree of influence on the environmental sensor 400 by the light from each of the lighting devices 100 to 130, as well as to acquire the position of the environmental sensor 400 based on the degree of influence, it is possible to acquire the accurate position of the environmental sensor 400 reflecting changes in the degree of influence due to the relocation of the environmental sensor 400, without foreknowledge of the degree of influence as in the related art.

In addition, a noise component that affects the position acquisition of the environmental sensor 400, such as natural light and shadows, is also acquired, and the degree of influence is computed using an appropriate algorithm depending on the noise component. Specifically, when no noise exists, the centralized lighting and air conditioning controller 300 controls the brightness configuration values of the lighting devices 100 to 130 according to a brightness configuration pattern A including five sets of brightness configuration pattern information, and computes the degree of influence by acquiring an illuminance measurement value from the environmental sensor 400 for each set of brightness configuration pattern information. Also, when the noise is natural light, in order to distinguish between the natural light and the light of the lighting devices 100 to 130, the centralized lighting and air conditioning controller 300 controls the brightness configuration values of the lighting devices 100 to 130 according to a brightness configuration pattern B, which is a sequence of brightness configuration values having a frequency component unique to each lighting device, and performs frequency analysis on the time series data of illuminance measurement values from the environmental sensor 400 to compute the degree of influence. Also, when the noise is shadows, in order to eliminate the change in the illuminance measurement values caused by the presence of a person between the environmental sensor 400 and the lighting device 100 or the like, the centralized lighting and air conditioning controller 300 controls the brightness configuration values of the lighting devices 100 to 130 according to a brightness configuration pattern A including five sets of brightness configuration pattern information, and for each set of brightness configuration pattern information, acquires multiple illuminance measurement values from the environmental sensor 400 to compute the most frequent value, and uses the most frequent value to compute the degree of influence. Also, when the noise is natural light and shadows, whether or not the noise exists is determined again after a predetermined standby time. In this way, since the position of the environmental sensor 400 is acquired by computing the degree of influence using an appropriate algorithm depending on the noise component, it is possible to acquire a more accurate position of the environmental sensor 400.

The foregoing thus describes an embodiment of the present disclosure, but the present disclosure is not limited to the present embodiment. The present disclosure also includes appropriate combinations of the embodiment and the following exemplary modifications, as well as the equivalents thereof.

For example, in the foregoing embodiment, the algorithms in steps S102 to S108 of FIG. 5 are applied depending on the presence or absence of noise, but the configuration is not limited thereto. For example, when no noise exists, an algorithm that is weak to noise but is able to detect a position quickly or with a simple calculation may be applied, whereas when noise due to natural light exists, an algorithm that eliminates noise of comparatively low frequency may be applied, and when noise due to shadows exists, an algorithm that eliminates noise of comparatively high frequency may be applied.

Also, in the foregoing embodiment, when noise due to shadows is determined to exist, noise occurs only for a comparatively short time during which a person is present between the environmental sensor 400 and the lighting device 100 or the like, for example. However, a case in which a person stays near the environmental sensor 400 for a comparatively long time is also conceivable. For example, it is supposed that there is a case in which the environmental sensor 400 is installed at a seat where no one is present, but for one day only, a person sits in that seat, and as a result noise due to shadows continues for a long time. In such cases in which noise due to shadows is expected to continue for a long time, position acquisition of the environmental sensor 400 may not be conducted, or in other words, the process may proceed to step S108 in FIG. 5. In addition, an environment in which noise occurs due to a person passing by may be distinguished from an environment in which noise occurs due to the long-term presence of a person, based on factors, such as the time over which the RSSI varies and the range of variation in the RSSI.

This application is based on Japanese Patent Application No. 2013-86346 filed in the Japan Patent Office on Apr. 17, 2013. The entirety of the specification, claims, and drawings of Japanese Patent Application No. 2013-86346 are hereby incorporated by reference.

INDUSTRIAL APPLICABILITY

The present disclosure may be implemented favorably in technology for controlling lighting devices.

REFERENCE SIGNS LIST

1 Lighting and air conditioning control system
100, 110, 120, 130 Lighting device
101 Light source
102 Dimmer
103 Wired communication module
200, 210, 220 Air conditioning device
300 Centralized lighting and air conditioning controller
301 Communication module
302 Centralized controller control module
303 Lighting/air conditioning position database
304 Environmental sensor position acquirer
305 Position acquisition program
306 Illuminance sensor value database
400, 410, 420, 430 Environmental sensor
401 Wireless communication module
402 Illuminance sensor
403 Temperature sensor
404 Humidity sensor
405 Environmental sensor control module
500 Window

The invention claimed is:
1. A lighting control system comprising:
a plurality of lighting devices configured to emit light;
a control device configured to control the plurality of lighting devices; and
a measuring device configured to measure an illumination, wherein
the measuring device comprises:
  a transmitter configured to transmit a wireless signal indicating an illumination measurement to the control device,
the control device comprises:
  a receiver configured to receive the wireless signal indicating the illumination measurement from the measuring device; and
  a position acquirer, and
the position acquirer is configured:
  to apply, prior to a period that the lighting device is controlled by an emission pattern, the illumination measurement indicated by the wireless signal received by the receiver and a received signal intensity of the wireless signal received by the receiver to a noise correspondence relationship to acquire a noise in an illumination target region, the noise correspondence relationship being a relationship between the noise preventing an acquisition of a position of the measuring device, the illumination measurement, and the received signal intensity;
  to apply the acquired noise to an emission correspondence relationship to acquire an emission pattern per the lighting device, the emission correspondence relationship being a relationship between the noise, the measurement value, and a pattern of change of each lighting device in order to remove an influence of the noise from the received signal intensity;

to control the plurality of lighting devices to emit light according to the acquired emission pattern;
while the plurality of lighting devices emits the light according to the acquired emission pattern, based on the illumination measurement measured by the measuring device and the emission pattern per the lighting device, to acquire a degree of influence of emission per the lighting device relative to the illumination measurement by the measuring device; and
to acquire, based on positions of the plurality of lighting devices and the degree of influence per the lighting device, the position of the measuring device relative to the positions of the plurality of lighting devices.

2. The lighting control system according to claim 1, wherein the position acquirer is configured to acquire, as the noise, natural light other than the light from the plurality of lighting devices and a mobile object.

3. The lighting control system according to claim 2, wherein
the position acquirer:
  when, prior to a period that each lighting device is controlled by the emission pattern, a variation of the illumination measurement is less than or equal to a first threshold value and a variation of the received signal strength indicator of the wireless signal indicating the illumination measurement is less than or equal to a second threshold value, determines that the natural light and the mobile object are absent;
  when, prior to a period that each lighting device is controlled by the emission pattern, the variation of the illumination measurement exceeds the first threshold value and the variation of the received signal strength indicator of the wireless signal indicating the illumination measurement is less than or equal to the second threshold value, determines that the natural light is present and the mobile object is absent;
  when, prior to a period that each lighting device is controlled by the emission pattern, the variation of the illumination measurement is less than equal to the first threshold value and the variation of the received signal strength indicator of the wireless signal indicating the illumination measurement exceeds the second threshold value, determines that the natural light is absent and the mobile object is present; and
  when, prior to a period that each lighting device is controlled by the emission pattern, the variation of the illumination measurement exceeds the first threshold value and the variation of the received signal strength indicator of the wireless signal indicating the illumination measurement exceeds the second threshold value, determines that the natural light and the mobile object are present.

4. The lighting control system according to claim 3, wherein
the position acquirer:
  acquires, when determined that the natural light and the reflection are absent, a first emission pattern of which an illumination is different for each lighting device of the plurality of lighting devices, and acquires, while the plurality of lighting devices emits the light according to the acquired first emission pattern, based on the illumination measurement measured by the measuring device and the first emission pattern per the lighting device, the degree of influence of emission per the lighting device relative to the illumination measurement by the measuring device;

acquires, when determined that the natural light is present and the mobile object is absent, a second emission pattern so that light including a frequency component that is different for each lighting device is emitted, and acquires, while the lighting device emits the light according to the acquired second emission pattern, based on the frequency component indicated by the illumination measurement measured by the measuring device and the second emission pattern per the lighting device, the degree of influence of emission per the lighting device relative to the illumination measurement by the measuring device;

acquires, when determined that the natural light is absent and the mobile object is present, a third emission pattern of which an illumination is different for each lighting device, and acquires, while the lighting device emits the light according to the acquired third emission pattern, based on a mode of measurements of the illumination measured by the measuring device and the third emission pattern per the lighting device, the degree of influence of emission per the lighting device relative to the illumination measurement by the measuring device; and re-acquires, when determined that the natural light and the mobile object are present, the noise after a predetermined time has passed.

5. A lighting control method comprising:

transmitting, by a measuring device configured to measure an illumination, a wireless signal indicating an illumination measurement;

receiving, by a control device configured to control the plurality of lighting devices, the wireless signal indicating the illumination measurement from the measuring device;

applying, by the control device, prior to a period that the lighting device is controlled by an emission pattern, the illumination measurement indicated by the wireless signal received by the receiver and a received signal intensity of the wireless signal received by the receiver to a noise correspondence relationship to acquire a noise in an illumination target region, the noise correspondence relationship being a relationship between the noise preventing an acquisition of a position of the measuring device, the illumination measurement, and the received signal intensity;

applying, by the control device, the acquired noise to an emission correspondence relationship to acquire an emission pattern per the lighting device, the emission correspondence relationship being a relationship between the noise, the measurement value, and a pattern of change of each lighting device in order to remove an influence of the noise from the received signal intensity;

controlling, by the control device, the plurality of lighting devices to emit light according to the acquired emission pattern;

while the plurality of lighting devices emits the light according to the acquired emission pattern, based on the illumination measurement measured by the measuring device and the emission pattern for the lighting device, acquiring, by the control device, a degree of influence of emission per the lighting device relative to the illumination measurement by the measuring device; and acquiring, by the control device, based on positions of the plurality of lighting devices and the degree of influence per the lighting device, the positions of the measuring device relative to the positions of the plurality of lighting devices.

* * * * *